June 5, 1951  S. L. TOLMAN  2,556,014
WATER TREATING APPARATUS
Filed April 23, 1948

INVENTOR;
SAMUEL L. TOLMAN,
BY

ATT'Y.

Patented June 5, 1951

2,556,014

UNITED STATES PATENT OFFICE 2,556,014

WATER TREATING APPARATUS

Samuel L. Tolman, Grandview, Ohio, assignor to The Jeffrey Manufacturing Company, a corporation of Ohio Application April 23, 1948, Serial No. 22,845

3 Claims. (Cl. 259—21)

This invention relates to an apparatus for treating water, and the principal object of the invention is to provide an improved apparatus of this kind that includes a basin provided with walls dividing it into a plurality of flocculating cells or compartments each adapted to contain an agitator for agitating liquid therein undergoing flocculation and a dry well within the basin for housing driving mechanism for the agitators below the level of the liquid within the basin whereby the driving mechanism is not exposed to the liquid and its detrimental action and is readily accessible for lubrication, repair or replacement without necessitating the draining of the flocculating basin.

Other objects of the invention will appear hereinafter, the novel features and combinations being set forth in the appended claims.

Figure 1:
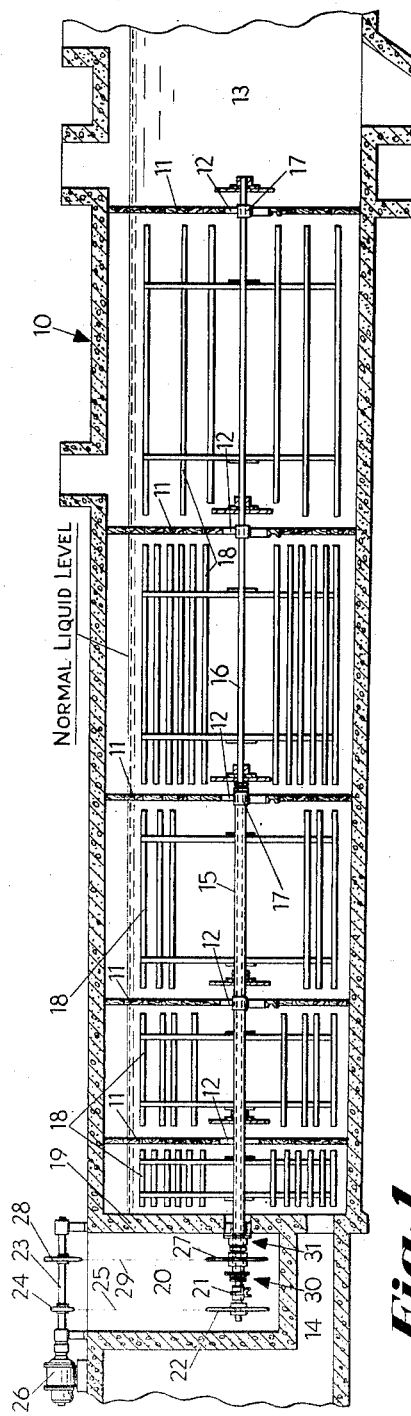
Figure 2:
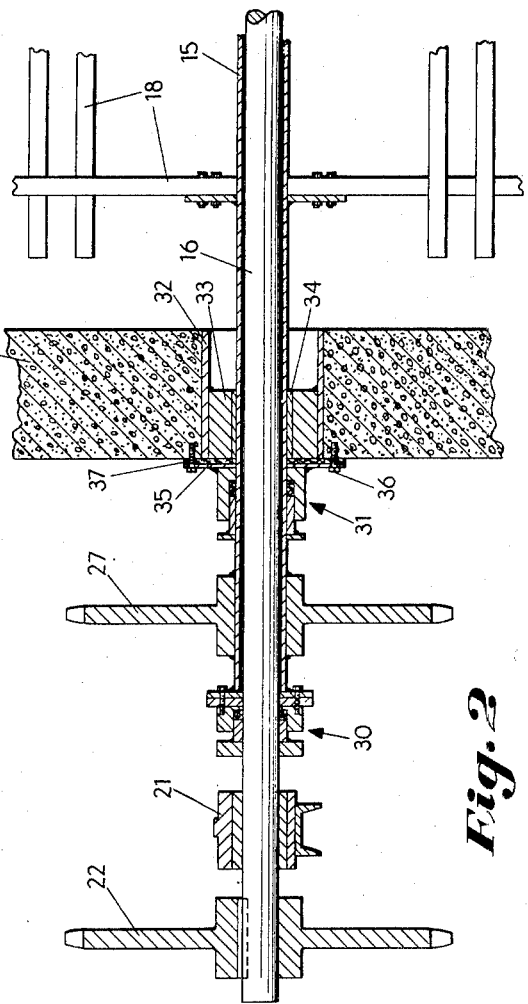

In the accompanying drawings,

Fig. 1 is a sectional elevational view through a flocculating apparatus showing also a portion of the subsequent settling tank; and Fig. 2 is an enlarged sectional view showing the drive sprocket for the concentric drive shafts of a plurality of differently driven agitators, together with stuffing boxes or packing means to prevent flow of liquid into the dry well.

The apparatus shown in the drawings includes a flocculating basin or tank 10 which, for example, may be formed of poured concrete, within which the liquid which is undergoing flocculation treatment may have a normal level as indicated in Fig. 1 of the drawings. The flocculating basin 10 is preferably divided into a plurality of cells or compartments by vertical partitions or walls 11 which preferably have central openings 12 through which the liquid flows from one compartment to the next. The last of said partitions or walls 11 divides the flocculating basin from a settling tank 13 which may be provided with the usual mechanical sludge removing mechanism, or not, as desired.

The liquid to be treated in the flocculating basin flows into the first cell by way of influent conduit 14. Within each of the cells of the basin 10 there is an individual agitating mechanism preferably in the form of a rotatable paddle wheel 18. As illustrated in the drawings, the first three compartments have rotating paddle wheels 18 rigidly attached to the outer hollow shaft 15 of a pair of concentric shafts, the inner one of which is designated 16 and is preferably solid. As clearly illustrated in Fig. 2 of the drawings, the concentric shafts 15 and 16 extend through the openings 12 in partitions or walls 11 and they are preferably supported upon bearings 17 adjacent some of said openings 12. The paddle wheel agitators 18 in the first three cells are supported on outer hollow shaft 15, as above mentioned, while the paddle wheels 18 in the last two cells are mounted upon the inner shaft 16.

As hereinafter described, the shafts 15 and 16 are preferably driven at different speeds, and the shaft 15 is preferably driven at the greater speed, since the agitation is preferably progressively decreased from compartment to compartment as liquid flows through the agitating basin, and the retention time of the liquid is preferably progressively increased as said material flows through successive cells of said flocculating basin.

The two concentric shafts 15 and 16 project through an upright end wall 19 adjacent the influent end of the flocculating basin or tank 10, which wall 19 also constitutes a wall of a dry well 20. Within the dry well 20 there is a supporting bearing 21 which supports the shaft 16 directly and the shaft 15 indirectly. Shaft 16 extends beyond the shaft 15 and it carries a sprocket 22 driven from a head shaft 23 through a sprocket 24 and a chain 25. Head shaft 23 is driven from a motor 26, preferably through reduction gearing. The hollow shaft 15 carries a sprocket 27 located within the well 20, which is driven from the head shaft 23 through a sprocket 28 and chain 29.

To prevent the liquid in the basin 10 flowing into the dry well 20, a seal or stuffing box 30 is provided between said hollow shaft 15 and said solid shaft 16, the seal 30 being essentially of standard construction, the details of which are readily ascertained from Fig. 2 of the drawings. Between the hollow shaft 15 and the wall 19 there is a second seal or stuffing box 31. The seal 31 is likewise of generally standard construction except that some special provision is, of course, necessary because of the wall 19. To this end the hole or opening in the wall 19 through which the shafts 15 and 16 extend is provided with a metal cylinder 32 which is rigidly held in place when the wall 19 is poured. Cylinder 32 carries an internal ring 33 provided with a bushing 34 which has a close fit with the external surface of shaft 15 and constitutes one bearing support thereof.

The cup portion of stuffing box 31 is welded to a disc like plate 35 which is bolted by bolts 36 anchored by wall 19 when it is poured, there preferably being a packing gasket 37 interposed between the plate 35 and the wall 19 as well as between said plate 35 and the outer edge of the cylinder 32 and ring 33.

From the foregoing description it is readily apparent that I have provided an improved water treating apparatus in which there is a basin 10 that is divided by walls into a plurality of flocculating compartments and a dry well 20 the bottom of which extends below the level of the liquid in the flocculating compartments. It will also be seen that the bottom wall of the dry well cooperates with other walls of the basin 10 including its bottom wall and the wall 19 to form an opening or passageway 14 in the basin through which liquid flows into the first flocculating compartment of the basin 10. The outer concentric shaft 15 extends from the dry well 20 through the shaft seal 31 carried within the dry well 20 by the wall 19 into the first flocculating chambers of the basin 10 and in each of these flocculating chambers the shaft 15 carries and drives an agitator individual to each chamber and the shaft 16 extends from within the dry well 20 through the outer shaft 15 and into the last of the flocculating compartments where it carries and drives an agitator 18 individual to each of these compartments. The end of outer shaft 15 within the dry well 20 is sealed to the shaft 16 by the stuffing box or shaft seal 30.

It is important to note that by employing the construction and arrangement above described none of the driving mechanism for driving the shafts 15 and 16 is required to operate in or be exposed to the liquid undergoing flocculation in the basin 10, and that the driving mechanism carried within the dry well 20 below the level of the liquid in the basin 10 is always dry and exposed to a mechanic who may enter the dry well 20 to lubricate or repair it. The construction also provides for the rotation of the shafts 15 and 16 at different speeds which is desirable in the flocculating apparatus. The different speeds are provided, of course, by virtue of the different sizes in the sprockets 24 and 28, even though sprockets 22 and 27 are the same size as they are illustrated.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Water treating apparatus including a basin adapted to contain liquid, wall means dividing said basin into a plurality of flocculating compartments and a dry well, the said wall means between said flocculating compartments including openings through which liquid may flow from one flocculating compartment to the next, said dry well being at one end of said basin and extending below the level of the liquid in said basin, a pair of concentric shafts in said basin below the level of the liquid therein the outer of which extends from said dry well into one of said flocculating compartments and the inner of which extends from said dry well through the outer shaft and into another of said flocculating compartments, individual agitator mechanisms in each of said flocculating compartments each carried by one of said shafts, shaft sealing means within said dry well associated with said shafts for preventing the entrance into said dry well of liquid from said basin, a sprocket carried by each of said shafts within said dry well, a motor and head shaft carrying a pair of sprockets above said dry well, chains interconnecting each of said head shaft sprockets with one of said shaft sprockets within the dry well, said sprockets being of such sizes that said concentric shafts are driven at different speeds with respect to each other, and wall means including a wall of said dry well cooperating to form a passageway for liquid connected with the flocculating compartment adjacent said dry well.

2. Water treating apparatus including a basin adapted to contain liquid, wall means dividing said basin into a plurality of flocculating compartments and a dry well, the said wall means between said flocculating compartments including openings through which liquid may flow from one flocculating compartment to the next, said dry well being at one end of said basin and extending below the level of the liquid in said basin, a pair of concentric shafts in said basin below the level of the liquid therein the outer of which extends from said dry well into one of said flocculating compartments and the inner of which extends from said dry well through the outer shaft and into another of said flocculating compartments, individual agitator mechanisms in each of said flocculating compartments each carried by one of said shafts, shaft sealing means within said dry well associated with said shafts for preventing the entrance into said dry well of liquid from said basin, means within said dry well below the level of the liquid in said basin for driving said shafts at different speeds with respect to each other, and wall means including a wall of said dry well cooperating to form a passageway for liquid connected with the flocculating compartment adjacent said dry well.

3. Water treating apparatus including a basin adapted to contain liquid, wall means dividing said basin into a plurality of flocculating compartments and a dry well, the bottom wall of said dry well cooperating to provide a conduit through which liquid may flow, the said wall means between said flocculating compartments including openings through which liquid may flow from one flocculating compartment to the next, said wall means providing said dry well in said basin extending below the level of the liquid in said flocculating compartments, agitators in said flocculating compartments including sealed shaft means extending into said dry well, whereby mechanism for driving the agitators in said flocculating compartments may be housed in said dry well within said basin and below the level of said liquid.

SAMUEL L. TOLMAN.

REFERENCES CITED

The following references are of record in the file of this patent:

UNITED STATES PATENTS

| Number | Name | Date |
|---|---|---|
| 1,512,665 | Bagby | Oct. 21, 1924 |
| 2,010,579 | Broadfield | Aug. 6, 1935 |
| 2,059,485 | Payne et al. | Nov. 3, 1936 |
| 2,141,045 | Ruttiman | Dec. 20, 1938 |
| 2,209,287 | Simpson | July 23, 1940 |
| 2,268,461 | Nichols | Dec. 30, 1941 |

FOREIGN PATENTS

| Number | Country | Date |
|---|---|---|
| 111,518 | Switzerland | Aug. 17, 1925 |
| 435,400 | Great Britain | Sept. 17, 1935 |
| 625,884 | France | Aug. 22, 1927 |